United States Patent [19]
Hudson

[11] Patent Number: 5,741,116
[45] Date of Patent: Apr. 21, 1998

[54] COMPRESSOR THRUST BEARINGS

[75] Inventor: James H. Hudson, Appleton, Wis.

[73] Assignee: Delaware Capital Formation Inc., Wilmington, Del.

[21] Appl. No.: 769,145

[22] Filed: Dec. 18, 1996

[51] Int. Cl.$^6$ ............................................. F01D 3/00
[52] U.S. Cl. ................................. 415/104; 415/107
[58] Field of Search .............................. 415/104, 107; 384/223, 420

[56] References Cited

U.S. PATENT DOCUMENTS

| | | |
|---|---|---|
| 154,761 | 9/1874 | Marsland . |
| 215,782 | 5/1879 | Wilson . |
| 388,227 | 8/1888 | Smith . |
| 433,143 | 7/1890 | Peck . |
| 513,367 | 1/1894 | Parsons . |
| 555,109 | 2/1896 | McGarry . |
| 563,134 | 6/1896 | Campbell . |
| 602,589 | 4/1898 | Sellers . |
| 957,797 | 5/1910 | Parsons et al. . |
| 1,015,315 | 1/1912 | Hodgkinson . |
| 1,020,745 | 3/1912 | Debes . |
| 1,076,399 | 10/1913 | Wagner . |
| 1,117,499 | 11/1914 | Kingsbury . |
| 1,121,083 | 12/1914 | DeFerranti . |
| 1,131,739 | 3/1915 | Ruegger . |
| 1,268,906 | 6/1918 | Wintroath . |
| 1,296,211 | 3/1919 | Parsons et al. . |
| 1,315,069 | 9/1919 | Alexanderson . |
| 1,425,979 | 8/1922 | Kingsbury . |
| 1,459,468 | 6/1923 | Howarth . |
| 1,607,390 | 11/1926 | Davis . |
| 1,673,021 | 6/1928 | Reavis . |
| 1,677,093 | 7/1928 | Johnson . |
| 1,689,195 | 10/1928 | Davis . |
| 1,905,333 | 4/1933 | Barrett . |
| 1,956,648 | 5/1934 | Messinger . |
| 2,708,610 | 5/1955 | Donaldson et al. . |
| 3,033,620 | 5/1962 | Balzer . |
| 3,043,637 | 7/1962 | Biedendieck et al. . |
| 3,075,816 | 1/1963 | Harris et al. . |
| 3,154,355 | 10/1964 | McCafferty . |
| 3,158,415 | 11/1964 | Gardner . |
| 3,183,048 | 5/1965 | Komor . |
| 3,410,617 | 11/1968 | Schaefer . |
| 3,655,250 | 4/1972 | Sprenger . |
| 3,712,693 | 1/1973 | Root et al. . |
| 3,734,581 | 5/1973 | LeBreton . |
| 3,947,078 | 3/1976 | Olsaker . |
| 4,033,647 | 7/1977 | Beavers . |
| 4,168,101 | 9/1979 | Digrande . |
| 4,270,814 | 6/1981 | Bellati . |
| 4,273,390 | 6/1981 | Swearingen et al. . |
| 4,275,938 | 6/1981 | Roberts . |
| 4,309,144 | 1/1982 | Eggmann et al. .......... 415/107 |
| 4,323,285 | 4/1982 | Gilson . |
| 4,369,668 | 1/1983 | Pollak et al. . |
| 4,560,014 | 12/1985 | Geczy . |
| 4,856,914 | 8/1989 | Sigg . |
| 5,104,284 | 4/1992 | Hustak, Jr. et al. .......... 415/107 |
| 5,142,174 | 8/1992 | Ide . |
| 5,248,239 | 9/1993 | Andrews ................... 415/107 |
| 5,312,225 | 5/1994 | Lorenzen .................. 415/107 |
| 5,480,233 | 1/1996 | Cunningham . |

*Primary Examiner*—John T. Kwon
*Attorney, Agent, or Firm*—Foley & Lardner

[57] ABSTRACT

A single stage centrifugal compressor is disclosed having a drive shaft with two thrust bearing collars disposed in a casing. The thrust collars are coupled to two sets of pads tiltingly engaged to two respective base plates. One or both of these base plates are coupled to the casing by a resilient member. This resilient member, by deflecting with the load allows the force applied to the thrust bearings to be balanced between the thrust bearings. It may be formed as two arcuate portions extending partially around the drive shaft or as a single ring. It may be formed as an annular portion with slots extending substantially radially outward from the rotational axis of the drive shaft outward to an outer surface facing away from the drive shaft, or may be made of two substantially parallel plates with an elastomeric layer sandwiched in between. The elastomeric layer may be either a single solid sheet or several elastomeric elements separated by gaps that allow the elastomer to expand outward when compressed.

9 Claims, 3 Drawing Sheets

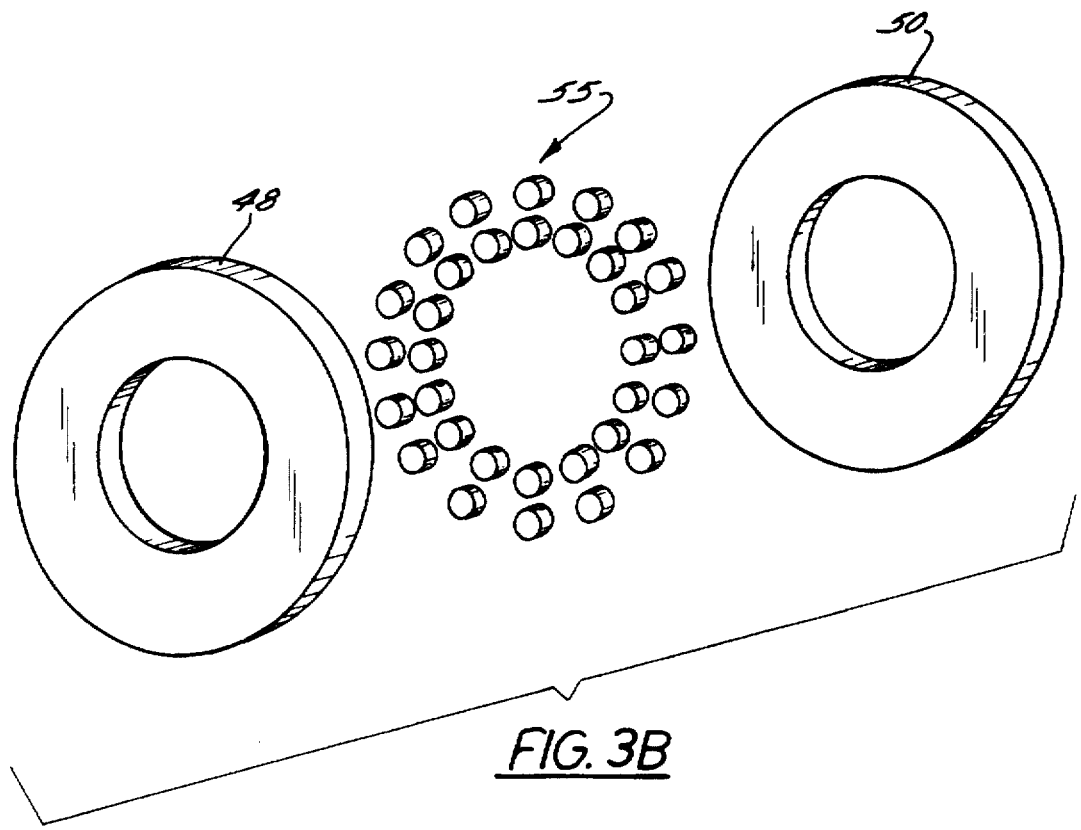
FIG. 3B
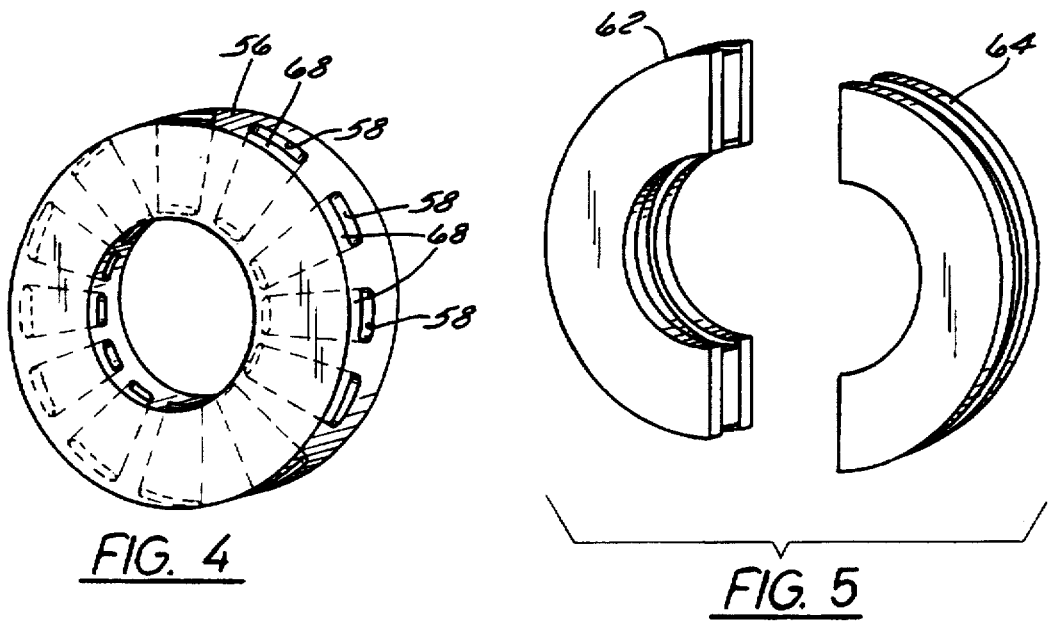
FIG. 4
FIG. 5

COMPRESSOR THRUST BEARINGS

FIELD OF THE INVENTION

This invention relates generally to compressors. More particularly, it relates to thrust control in centrifugal compressors. More particularly, it relates to centrifugal compressors having two or more thrust bearings.

BACKGROUND OF THE INVENTION

Large single stage centrifugal compressors typically have an impeller located at one end of a rotating shaft, two journal bearings disposed along the length of the shaft and a thrust bearing disposed between the two. Thrust bearings are typically of the "Kingsbury" type, consisting of a thrust collar formed on the rotating shaft and a plurality of tilting pads coupled by cantilevered beams connecting the pads. The pads are supported inside the nonrotating compressor housing and do not rotate. Thrust generated against the rotating element is transmitted to the thrust collar, to the pads, and then to the compressor housing. In this manner, thrust generated by imbalanced pressure acting on the compressor rotating element is balanced by an equal and opposite opposing thrust generated against the thrust collar by the thrust pads.

To reduce friction between the thrust pads (which do not rotate) and the thrust collar (which does), an oil lubrication system is typically employed to create a film between the thrust collar and the thrust pads. The thrust bearing cavity is flooded with oil, which is then pulled in between the thrust bearing pads and the thrust collar by hydrodynamic action of the rotating thrust collar. The oil film so created measures between 0.0005 and 0.002 inches, approximately, depending upon a variety of factors, including the axial force between the thrust collar and pads, the rotational speed of the shaft, and the temperature and viscosity of the oil, among other factors.

One limitation to the use of Kingsbury thrust bearings for high speed rotating machinery is their inherent thrust load limitations. As the thrust load increases on a thrust bearing of a given size, the oil film is reduced in thickness and the shear forces acting upon the oil film are greater. The result is increased oil temperature and increased thrust pad temperature. As the thrust increases further, the bearing pad temperature reaches a point at which the bearing surface material enters into a creep region.

One possible cure for this problem is to redesign the thrust bearing to have a greater contact area between the thrust collar and the thrust bearing pads by increasing the overall diameter of the bearing. This cure is also limited, however, due to another factor: as the thrust collar diameter increases the peripheral velocity increases proportionally further increasing the bearing pad temperature. Very often, there is little net gain from increased bearing diameter in high speed machinery.

Another possible cure that avoids these limitations is to provide a plurality of thrust bearings. Rather than providing a compressor with one large diameter thrust bearing, two or more thrust bearings having a smaller diameter may be provided. In this manner, the load may be shared between the two thrust bearings without increasing the overall thrust bearing diameter.

Alignment is a serious problem when two or more thrust bearings are disposed along the same shaft. With an oil film thickness of between 0.0005 and 0.002 inches, even a slight axial misalignment of a thrust collar with respect to its pads can cause that thrust bearing to carry all the load, thereby defeating the purpose of having several thrust bearings. Even if the tolerances are minimized during manufacture by careful machining, the inevitable heating and cooling during normal operation and the consequent expansion and contraction of the compressor casing and compressor shaft can cause a misalignment to occur.

To reduce problems associated with plural thrust bearing misalignment, some have proposed reengineering the Kingsbury-type or self-equalizing thrust bearing by spring loading each of its pads and mounting each to an oil filled piston such as is shown in U.S. Pat. No. 4,856,914. This solution is complex at best, and requires too much additional engineering for compressor manufacturers that are accustomed to purchasing and using Kingsbury thrust bearings as a unit and not in designing and building them for each application.

What is needed therefore is an improved axial load carrying system for single stage overhung compressors that will provide for better control of axial loads. It is an object of this invention to provide a single stage overhung compressor capable of operating at increased pressure levels. It is also an object of this invention to provide a compressor having a plurality of thrust bearings. It is also an object of this invention to provide such a compressor with standard Kingsbury-type thrust bearings.

SUMMARY OF THE PRESENT INVENTION

A single stage overhung compressor is provided with two journal bearings for supporting the shaft and two thrust bearings disposed between the two journal bearings. The two thrust bearings are standard Kingsbury-type thrust bearings. Each thrust bearing pad is not supported by a separate resilient member, but is supported by the thrust bearing base plate, which itself is supported by a resilient member.

In accordance with the present invention, a single stage overhung compressor is provided including a compressor casing, a drive shaft disposed within the casing rotationally supported by the casing and having a first end extending out of the casing and adapted to be coupled to a rotational power source, an impeller coupled to the drive shaft and disposed within the casing, first and second thrust collars extending outward from the drive shaft, first and second sets of tilting thrust bearing pads, each set radially disposed about the drive shaft such that the first set of tilting pads slidingly engages the first thrust collar, and the second set of pads slidingly engages the second thrust collar, first and second base plates extending around the drive shaft and coupled to the respective first and second sets of pads whereby each of said set of pads tilts with respect to its respective base plate, and a first resilient member disposed around the drive shaft and coupled between the first base plate and the casing. The resilient member may include first and second annular plates and an elastomeric layer disposed between them. The elastomeric layer may be bonded to one or both of the plates. The elastomeric layer may be a single sheet of elastomer or it may include a plurality of elastomeric elements separated by a void. Alternatively, the resilient member may be a slotted annular ring disposed about the drive shaft. The slots may extend from an inner surface of the annular ring (facing the drive shaft) to an outer surface of the ring (facing away from the drive shaft). The slots may extend in a direction substantially perpendicular to the rotational axis of the drive. The resilient member described above may also be divided into two arcuate and abutting annular portions that extend in a plane perpendicular to the rotational axis of the drive shaft for about 180 degrees.

3

Other principal features and advantages of the invention will become apparent to those skilled in the art upon review of the following drawings, the detailed description and the appended claims.

BRIEF DESCRIPTION OF THE DRAWINGS

FIG. 3B is an exploded view of an alternative resilient member;

FIG. 4 is a perspective view of another embodiment of a resilient member; and

FIG. 5 is an illustration of a resilient member of FIG. 2 in section form.

Figure 1:
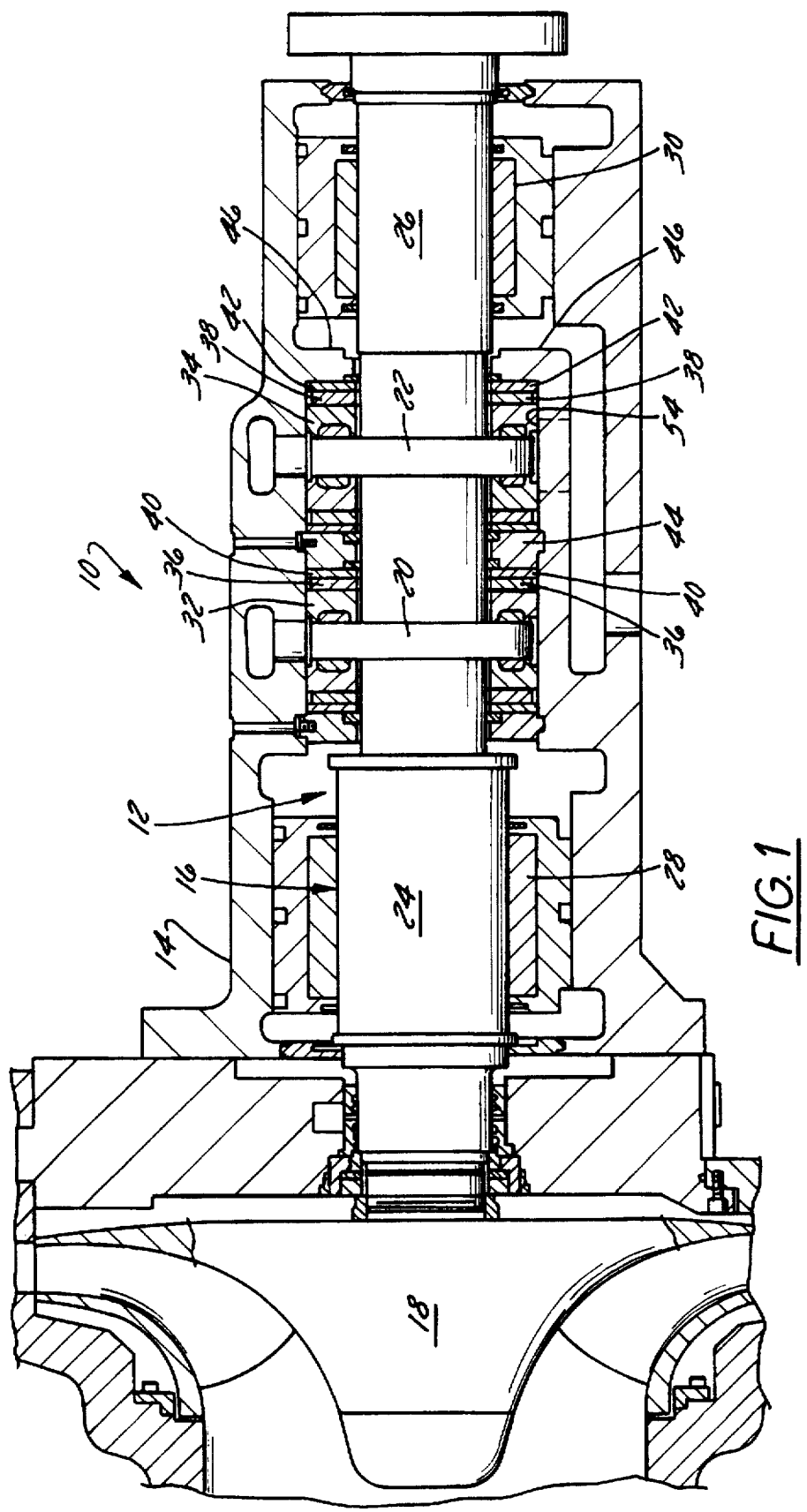
FIG. 1 is a partial cross-sectional view of a first embodiment of a compressor with a dual thrust bearing arrangement.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Compressor 10 includes rotor 12 and bearing housing 14. Rotor 12 includes shaft 16 coupled to impeller 18. Shaft 16 includes thrust collars 20, 22 disposed between journal bearing surfaces 24, 26. Surfaces 24, 26 rotationally engage multiple pad journal bearings 28, 30 which are coupled to bearing housing 14. Thrust collars 20, 22 engage two sets of thrust bearing pads 32, 34. Pad sets 32, 34 are in turn supported by base plates 36, 38, which are in turn supported by resilient members 40, 42. Resilient members 40, 42 are supported by flanges 44, 46 extending from bearing housing 14.

Unbalanced axial forces generated against impeller 18 are transmitted down shaft 16 to thrust collars 20, 22 where they are transmitted to pad sets 32, 34. The pad sets transmit the axial forces in turn to base plates 36, 38 which transmit the same forces to resilient members 40, 42, respectively. Resilient members 40, 42 transmit the axial forces to flanges 44, 46 on bearing housing 14.

Resilient members 40, 42 deflect axially in proportion to the load applied to them. Thus, if one thrust bearing tends to take too much load, its corresponding resilient member will deflect more than the resilient member coupled to the second thrust bearing, and the load will be shifted to the second thrust bearing.

Although this figure shows a structure having two resilient members, one behind each of the two thrust bearings, one is sufficient for applications where the manufacturing tolerances, the changes in film thickness with load, and the changes due to differential heating and consequent expansion are not severe.

This figure shows the benefit of a resilient member such as that disclosed herein. In prior art single thrust bearing compressors, the Kingsbury thrust bearing was supported directly by a flange extending from the casing. In the present configuration, the same Kingsbury thrust bearing can be employed with the addition of a resilient member disposed between the thrust bearing and the flange.

Many centrifugal compressors, such as that disclosed in FIG. 1 are used in chemical processing plants where they compress hot gases under high pressure. In such facilities the uneven expansion and contraction of the casing and the shaft can cause the various tolerances between the thrust bearings to change. To reduce this effect, the thrust bearings are preferably disposed adjacent to each other with the two journal bearings supporting the shaft disposed on either side of the thrust bearings.

Figure 2:
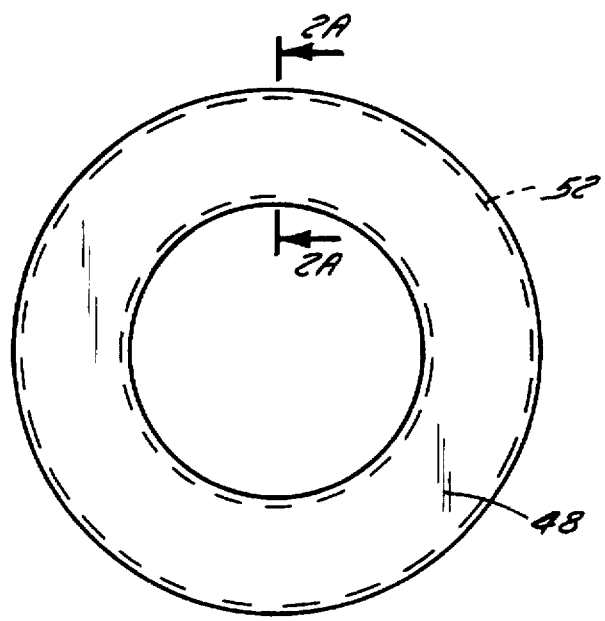
FIGS. 2 and 2A are plan and cross-sectional views, respectively, of a first embodiment of the resilient member shown in FIG. 1.
Figure 2A:
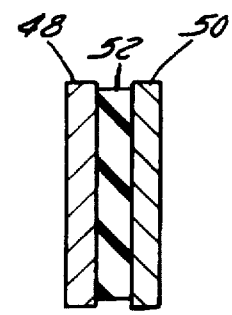

In FIG. 2, a resilient member is illustrated, showing circular plates 48 and 50 with an inner and an outer diameter. A elastomeric layer 52 is disposed between plates 48 and 50 and is preferably bonded to at least one of the plates, and more preferably to both plates. The outer diameter of the plates is substantially the same as the bearing cavity 54 (FIG. 1) in which the resilient member is disposed.

Figure 3A:
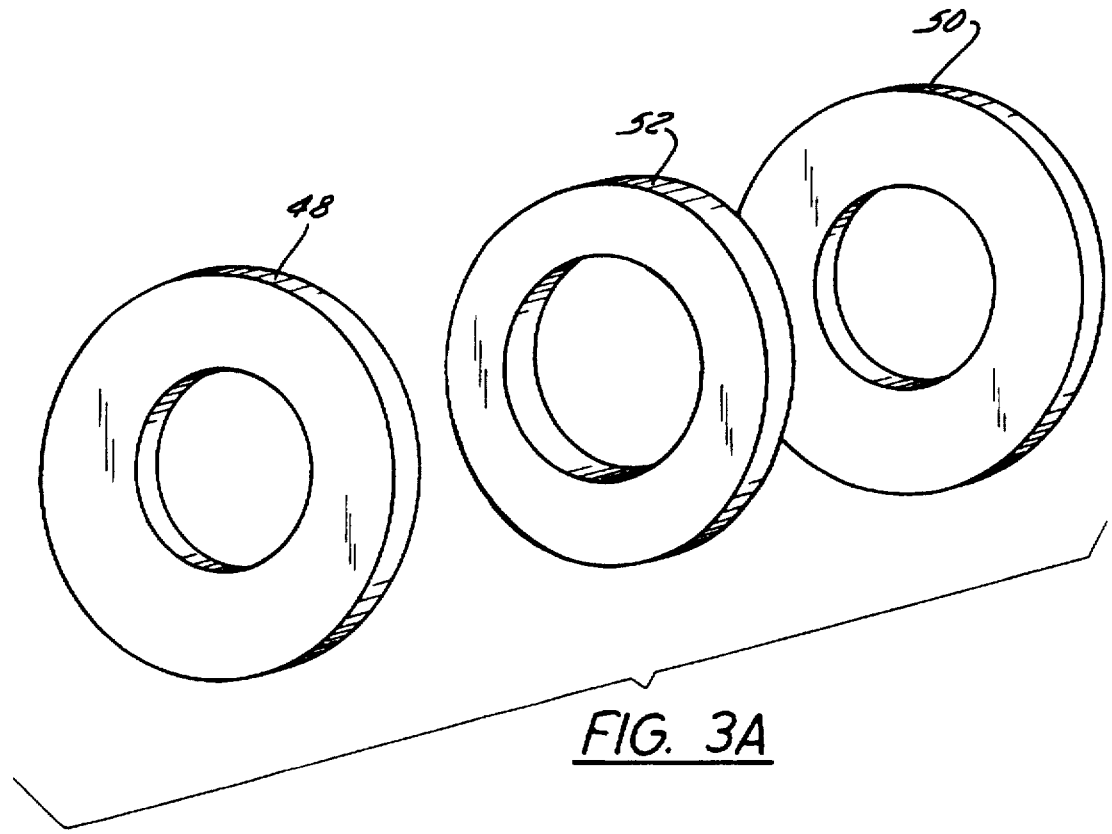
FIG. 3A is an exploded view of the resilient member of FIG. 2.

FIG. 3A illustrates an expanded view of an elastomeric layer 52 in the form of a single sheet for use in the FIG. 2 resilient member. Alternatively, FIG. 3B illustrates an elastomeric layer 54 in the form of a plurality of individual elastomeric elements separated from adjacent elastomeric elements by a void that can be used in the FIG. 2 resilient member. By providing voids, the FIG. 3B design reduces the shear forces generated within the elastomeric material that forms the elastomeric layer. When the elastomeric layer is compressed, each elastomeric element can bulge outward into its adjacent voids. By providing internal voids within the elastomeric layer the internal shear forces are reduced and the risk of failure consequently reduced as well.

A further advantage to the use of an elastomeric layer disposed between two plates lies in its "machinability." The final step in manufacturing a centrifugal compressor typically includes machining a spacer that fits between the single thrust bearing and the flange extending from the housing to which it was coupled. This spacer is machined to exacting tolerances to insure a perfect fit between the shaft (and thus the impeller) and the casing. All the tolerances of manufacture in the various components—thrust bearings, casing, impeller, shaft, and thrust flange—are accommodated and corrected for by a properly machined spacer fitting between the thrust bearing and the casing. The multiple thrust bearing apparatus of U.S. Pat. No. 4,856,914 has several separate and individual springs that must be machined to allow these tolerances to be accommodated. Conversely, a resilient member, such as that disclosed herein, has a single surface comprised of two plates and an elastomeric layer between the two that can be similarly machined to precise tolerances to provide the same in much the same manner as the spacer of previous designs.

FIG. 4 discloses another resilient member suitable for use with the FIG. 1 compressor. As with the FIGS. 2 and 3 embodiments, the resilient member is in the form of an annulus 56 having a hole through which shaft 16 passes. In this embodiment, however, rather than providing a multiple layer construction, a single annulus is provided with slots 58 machined in the walls in a plane substantially perpendicular to the axis of rotation of shaft 16. These slots 58 allow portions 60 of the resilient member to act as leaf springs, and to bend inward toward the slot when the resilient member is placed under a thrust load. This design also has the advantage of being used in place of the spacer typically inserted between the thrust bearing and the casing.

When a resilient member is disposed between two thrust collars, as is member 40 in FIG. 1, and when the thrust collars are of substantially the same outer diameter, a resilient member in the form of a single piece annular ring cannot be employed, such as the arrangement shown in FIG. 1. When the thrust collars are integrally formed with the shaft, a resilient member formed as an unbroken annulus cannot be fitted between the two thrust collars and around the shaft, since it is too large to fit over either thrust collar. In this case, the resilient member is preferably split in two. In FIG. 5, such a resilient member is illustrated. In this embodiment (which can have the internal construction of any of the resilient members described herein), the resilient member is formed as two portions 62, 64 of an annulus, each describing an arc of about 180 degrees about the central axis of the annulus—in effect, an annulus split in two by a plane passing through its cylindrical axis. This design also permits the resilient member to be replaced in sections from around the shaft without removing the shaft from the bearing housing or the journal bearings.

Thus, it should be apparent that there has been provided in accordance with the present invention compressor thrust bearings that fully satisfy the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A single stage compressor comprising:
   a compressor casing;
   a drive shaft disposed within the casing rotationally supported by the casing and having a first end extending out of the casing and adapted to be coupled to a rotational power source;
   an impeller coupled to the drive shaft and disposed within the casing;
   first and second thrust collars extending outward from the drive shaft;
   first and second sets of tilting thrust bearing pads, each set radially disposed about the drive shaft such that the first set of tilting pads slidingly engages the first thrust collar, and the second set of pads slidingly engages the second thrust collar;
   first and second base plates extending around the drive shaft and coupled to the respective first and second sets of pads whereby each of said set of pads tilts with respect to its respective base plate; and
   a first resilient member disposed around the drive shaft and coupled between the first base plate and the casing, and
   wherein the resilient member includes:
   first and second annular plates; and
   an elastomeric layer disposed between the first and second annular plates.

2. The single stage compressor of claim 1, wherein the elastomeric layer is bonded to at least one of the first and second annular plates.

3. The single stage compressor of claim 2, wherein the elastomeric layer is bonded to both the first and the second annular plates.

4. The single stage compressor of claim 3, wherein the elastomeric layer includes at least two elastomeric elements separated by a void.

5. The single stage compressor of claim 1, wherein the resilient member is formed of two arcuate and abutting portions.

6. A single stage compressor comprising:
   a compressor casing;
   a drive shaft disposed within the casing rotationally supported by the casing and having a first end extending out of the casing and adapted to be coupled to a rotational power source;
   an impeller coupled to the drive shaft and disposed within the casing;
   first and second thrust collars extending outward from the drive shaft;
   first and second sets of tilting thrust bearing pads, each set radially disposed about the drive shaft such that the first set of tilting pads slidingly engages the first thrust collar, and the second set of pads slidingly engages the second thrust collar;
   first and second base plates extending around the drive shaft and coupled to the respective first and second sets of pads whereby each of said set of pads tilts with respect to its respective base plate; and
   a first resilient member disposed around the drive shaft and coupled between the first base plate and the casing, and
   wherein the resilient member includes a slotted annular ring disposed about the drive shaft.

7. The single stage compressor of claim 6, wherein the slots extend from a surface of the annular ring facing the drive shaft to a surface of the annular ring facing away from the drive shaft.

8. The single stage compressor of claim 7, wherein the slots extend substantially perpendicular to a plane intersecting the rotational axis of the drive shaft.

9. A single stage compressor comprising:
   a compressor casing;
   a drive shaft disposed within the casing rotationally supported by the casing and having a first end extending out of the casing and adapted to be coupled to a rotational power source;
   an impeller coupled to the drive shaft and disposed within the casing;
   first and second thrust collars extending outward from the drive shaft;
   first and second sets of tilting thrust bearing pads, each set radially disposed about the drive shaft such that the first set of tilting pads slidingly engages the first thrust collar, and the second set of pads slidingly engages the second thrust collar;
   first and second base plates extending around the drive shaft and coupled to the respective first and second sets of pads whereby each of said set of pads tilts with respect to its respective base plate; and
   a first resilient member disposed around the drive shaft and coupled between the first base plate and the casing, and
   wherein the resilient member is formed of two arcuate and abutting portions, and
   wherein each of the arcuate and annular portions extends in a plane perpendicular to the rotational axis of the drive shaft for about 180 degrees around the drive shaft.

* * * * *